(12) United States Patent
Martin et al.

(10) Patent No.: US 9,947,422 B2
(45) Date of Patent: Apr. 17, 2018

(54) CONTROL METHOD FOR A PRESSURIZED WATER NUCLEAR REACTOR

(71) Applicant: AREVA NP, Paris la Defense (FR)

(72) Inventors: Jennifer Martin, Villemoisson sur Orge (FR); Jean Lucien Mourlevat, Noisy-le-Roi (FR); Alain Grossetete, Nanterre (FR); Pierre Barthelet, Vanves (FR)

(73) Assignee: AREVA NP, Paris la Defense (FR)

( * ) Notice: Subject to any disclaimer, the term of this patent is extended or adjusted under 35 U.S.C. 154(b) by 305 days.

(21) Appl. No.: 14/369,829

(22) PCT Filed: Dec. 26, 2012

(86) PCT No.: PCT/EP2012/076894
§ 371 (c)(1),
(2) Date: Jun. 30, 2014

(87) PCT Pub. No.: WO2013/098286
PCT Pub. Date: Jul. 4, 2013

(65) Prior Publication Data
US 2014/0314194 A1    Oct. 23, 2014

(30) Foreign Application Priority Data
Dec. 29, 2011 (FR) .................................. 11 62529

(51) Int. Cl.
*G21D 3/08* (2006.01)
*G21D 3/12* (2006.01)

(52) U.S. Cl.
CPC ............... *G21D 3/08* (2013.01); *G21D 3/12* (2013.01); *Y02E 30/40* (2013.01)

(58) Field of Classification Search
CPC . G21C 1/32; G21C 7/08; G21C 13/02; G21C 3/04; G21C 15/18; G21C 1/02;
(Continued)

(56) References Cited

U.S. PATENT DOCUMENTS 3,423,285 A * 1/1969 Rydin .................. G21D 3/08
376/217
4,222,822 A * 9/1980 Mueller .................. G21D 3/16
376/217

(Continued)

FOREIGN PATENT DOCUMENTS

FR         2583207 A1    12/1986
JP         61-280600      * 12/1986  ............... G21D 3/08

*Primary Examiner* — Jack W Keith
*Assistant Examiner* — Daniel Wasil
(74) *Attorney, Agent, or Firm* — Knobbe, Martens, Olson & Bear, LLP

(57) ABSTRACT

This invention relates to a control method for a pressurized water nuclear reactor, which comprises a core generating thermal power and means of acquiring magnitudes representative of core operating conditions. The method comprises a step to regulate the temperature of the primary coolant, if the temperature of the primary coolant for a given thermal power is outside a predefined set temperature interval (ΔTREF) depending on the reactor power. The set temperature interval (ΔTREF) is characterized by variable amplitude (ΔT) on a thermal power range between N % and 100% nominal power, where N is between 0 and 100 and comprises a zero amplitude at 100% nominal power, a zero amplitude at N % nominal power.

8 Claims, 4 Drawing Sheets

(58) Field of Classification Search
CPC . G21C 3/07; G21C 7/12; G21C 15/24; G21C 15/243; G21C 15/28; G21C 17/00; G21C 19/205; G21C 1/026; G21C 1/086; G21C 1/22; G21C 5/02; G21D 3/08; G21D 3/12; Y02E 30/40
USPC ....... 376/123, 128, 129, 130, 131, 132, 137, 376/140, 142, 144, 150, 153, 169, 186, 376/187, 198, 199, 201, 206, 263, 270, 376/274, 284, 297, 315, 316, 345, 369, 376/390, 394, 408, 410, 415, 441, 902, 376/914, 215, 216, 217, 218; 976/DIG. 19, DIG. 132, DIG. 130, 976/DIG. 113; 60/652, 660, 663, 679, 60/641.7, 645, 650
See application file for complete search history.

(56) References Cited

U.S. PATENT DOCUMENTS

| | | | | |
|---|---|---|---|---|
| 4,326,917 | A * | 4/1982 | Kelly | G21D 3/12 376/216 |
| 4,505,873 | A * | 3/1985 | Petetrot | G21D 3/12 376/211 |
| 5,200,139 | A * | 4/1993 | Mourlevat | G21D 3/04 376/216 |
| 8,654,916 | B2 * | 2/2014 | Grossetete | G21D 3/12 376/216 |
| 2004/0114703 | A1 * | 6/2004 | Bolton | G05D 23/1919 376/210 |
| 2010/0272223 | A1 * | 10/2010 | Fushimi | G21D 3/08 376/217 |

* cited by examiner

- PRIOR ART -

- PRIOR ART -

CONTROL METHOD FOR A PRESSURIZED WATER NUCLEAR REACTOR

CROSS-REFERENCE TO RELATED APPLICATIONS

This application is the U.S. National Phase under 35. U.S.C. § 371 of International Application PCT/EP2012/076894, filed Dec. 26, 2012, which claims priority to French Patent Application No. 1162529, filed Dec. 29, 2011. The disclosures of the above-described applications are hereby incorporated by reference in their entirety.

This invention relates to a control method for a pressurised water nuclear reactor to minimise effluent volumes and loads applied to control clusters of a pressurised water nuclear reactor.

The method according to the invention is particularly suitable for control of a nuclear reactor in frequency regulation or load following.

It may be useful, particularly in countries like France in which 80% of electricity is generated by nuclear reactors, for the global power output by reactors to vary so as to adapt to the needs of the electrical network that they supply: this is then called network following or load following.

The purpose of frequency regulation is to regulate production in real time to match consumption of electrical energy, for which variations with small amplitudes occur.

With load following, the power produced by the reactor is regulated so as to correspond to a program predetermined by the electricity network operating service. This prediction is usually daily but it can be weekly with daily adjustments. Load following can equally well cover one or several daily variations and prolonged operation at low power between full power and zero power.

Thus, it is particularly desirable to be able to operate reactors at low power for a long period during which the network demand is low, before returning to nominal power PN if necessary.

Frequency regulation is applied in parallel to this load following program, to adapt production of the reactor to match real network needs.

Power supplied by the reactor is regulated by control means positioning control clusters composed of neutron absorbing elements at different insertion positions in the core, to more or less absorb neutrons and possibly adjusting the concentration of a neutron absorbing compound such as boron, in the primary coolant, as a function of the required power and/or measurements output from the reactor core instrumentation.

For example, the control means are composed of a set of electronic and electrical equipment which, starting from measurements derived from instrumentation lines and comparing them with thresholds, create displacement orders for control clusters and/or modification of the boron concentration in the primary coolant by injection of water (dilution) or boron (boration).

Different methods for controlling a pressurised water nuclear reactor are known. In general, control consists of controlling and regulating at least the average temperature of the primary coolant $T_{moy}$ and the distribution of thermal (and neutron) power and particularly the axial power distribution in order to prevent the formation of a power unbalance between the high and low zones of the core.

The methods of regulating these parameters vary depending on the different control modes used, namely control modes commonly called mode mode A, mode G, mode X and mode T. In general, the average temperature $T_{moy}$ is regulated by displacement of the control clusters as a function of the different parameters such as the power demand from the turbine, the current value of the coolant temperature and a set temperature, and/or possibly modification of the boron concentration in the primary coolant to prevent control clusters from being inserted too far which could disturb the axial power distribution.

The choice of the method of controlling a nuclear reactor is determined considering the fact that action of control clusters has immediate effects while action by injection of boron in solution is comparatively slower.

Control mode A aims to keeping the average temperature of the coolant equal to the value of the reference temperature by displacement of the control clusters, the reference temperature being programmed as a function of the load (FIG. 1). When the operator reduces (or increases) the turbine load, the regulation system causes insertion (or extraction) of clusters to control the average temperature of the coolant such that it is equal to the reference temperature Tref, with an uncertainty defined by a dead band with a constant amplitude of about 0.5 to 1° C. around the value of the reference temperature (shown in dashed lines in FIG. 1). In moving, the control clusters disturb the power distribution, and particularly the axial distribution. When the axial unbalance limit is reached, the reduction (or increase) in load is accompanied by boration (or dilution) of the coolant in the primary circuit, so that the control clusters will not be inserted (extracted) beyond the limiting insertion position corresponding to the required limit of the axial unbalance. If a request for a fast power return occurs during a load following low level, there is a risk that the control clusters move quickly to the high stop without dilution action taking place quickly enough to prevent it. In this case, the load increase has to be slowed to make it compatible with the inertia of dilution/boration effects, otherwise significant cooling could occur which would be damaging to the strength of the mechanical equipment. Therefore, mode A is not particularly suitable for load following or frequency regulation.

In order to overcome this disadvantage, a method has been developed to control the temperature of the coolant of a conventional pressurised water reactor (i.e. a reactor controlled in mode A) to improve the load following capacity of the reactor. Such a method is disclosed in document FR2583207.

To achieve this, the method defines a reference temperature $T_{PROG}$ (FIG. 2) during load variations that is different from the reference temperature $T_{REF}$ during operation under stable conditions. The reference temperature during a load variation called the programmed reference temperature ($T_{PROG}$), attempts to follow a set value that also minimises variations in the boron concentration of the coolant. This programmed reference temperature is limited to an upper limit and a lower limit, these limits delimiting a region in which the variation profile of the programmed reference temperature during load following can be programmed. FIG. 2 shows a programmed profile for variation of the reference temperature during load following to change from 100% nominal power to 50% nominal power followed by a return to 100% nominal power. Programming such a reference temperature variation profile has a secondary advantage that it reduces the number of steps of the cluster control mechanisms in some operating cases such as frequency regulation. However, this reduction in the number of steps is not particularly significant and it cannot significantly increase the life of these control mechanisms.

Despite the use of this control method to improve the load following capacity of a reactor controlled in mode A, fast or large amplitude power variations are always difficult particularly due to the limited action speed of boration or dilution operations.

There are also other known control modes that are more suitable for load following, namely modes G, X and T.

Mode G allows for the possibility of a fast return to 100% nominal power by removing the control clusters, when determining the insertion position of control clusters. To achieve this, control mode G controls two types of groups of control clusters with different neutron absorptivity values. The insertion position of one of the groups depends on the power level and guarantees the possibility of a fast return to nominal power PN. The word "fast" refers to a sufficiently fast load increase so that the variation of the xenon concentration is low, in other words a load increase with a load buildup rate typically between 3% and 5% PN/min. The other group of control rods is heavier, and is specifically used for control of the average temperature $T_{moy}$ of the reactor, and indirectly by dilution and boration operations, to control of the axial power distribution.

Control modes X and T are advanced control modes that take account of the capacity to increase to power $P_{max}$ previously chosen by an operator between the current power and 100% nominal power, in positioning the control clusters. The capacity to increase to power $P_{max}$, means the possibility of quickly increasing power, in other words at a rate of increase typically between 2% and 5% PN/min, from a low power to a high power (set value Pmax) previously defined by the operator during programming of load following.

Unlike mode A, control modes G, X and T are modes that are adapted to operation of pressurised water reactors in load following or in frequency regulation. However, temperature regulation nevertheless makes significant use of the control rods and treatment of effluents is expensive for the operator and makes it necessary to create waste, although the allowable volume of waste is becoming more and more strictly controlled (environmental impact).

The number of steps that can be performed by control cluster control mechanisms is limited. This limit might be reached before the 60 years life of the reactor if manoeuvres are made frequently. The control mechanisms would then have to be replaced, which would require an expensive and complex maintenance operation.

This is the context in which the invention aims to solve the problems mentioned above by proposing a method of controlling a nuclear reactor and to optimise displacements of control rods during variations of the reactor power in load following or in frequency regulation and volumes of effluents created by dilution/boration operations of the primary coolant during variations of the reactor power during load following, regardless of the control mode used for the nuclear reactor.

To achieve this, the invention discloses a method of controlling a pressurised water nuclear reactor, said reactor comprising:

a core generating thermal power;

means of acquiring magnitudes representative of core operating conditions (thermal power, temperature of the primary coolant);

said method comprising a step to regulate the temperature of the primary coolant if the temperature of the primary coolant, for a given thermal power, is outside a predefined set temperature interval depending on the reactor power, said set temperature interval being characterised by:

a variable amplitude on a thermal power range between N % and 100% nominal power, where N is between 0 and 100;

a zero amplitude at 100% nominal power;

a zero amplitude at N % nominal power;

said regulation not taking place while the temperature of the primary coolant is inside said temperature interval for a given thermal power.

"Variable amplitude" means an amplitude that varies as a function of the thermal power, in other words with a variation (increase or reduction) of the amplitude as a function of the thermal power, as opposed to a constant amplitude over a thermal power range.

Zero amplitude corresponds to a unique value of the set temperature (point value).

Thus according to the invention, the set temperature is not defined exclusively by a temperature value associated with a thermal power, but rather by a "set temperature range" delimited by a high limit and a low limit, in which the temperature of the primary coolant can fluctuate freely during load following or during frequency regulation without triggering any regulation of the primary coolant temperature causing a displacement of the control rods and/or a modification of the boron concentration.

The definition of a set temperature interval for a given thermal power thus advantageously uses the effects of the reactivity related to temperature variations of the primary coolant within the set temperature interval to minimise actions to control the reactor reactivity. Thus, a free variation of the primary coolant temperature within the temperature interval can reduce actions of actuators (reduction or even elimination of some steps of cluster control mechanisms) and effluent volumes.

Advantageously, the set temperature interval has a maximum temperature amplitude for a thermal power or range of thermal powers on which frequency regulation is required for a nuclear reactor functioning in load following.

Thus, at a given power level, the set temperature interval is defined by a high allowable temperature (upper limit) and a low allowable temperature (lower limit), the difference between the high limit and the low limit defining the amplitude of the temperature interval.

Thus, the method according to the invention does not impose that a particular linear profile of the set reference temperature should be followed during load following. Such a set temperature profile makes it necessary to regulate the average temperature of the coolant by displacements of control clusters and/or modification of the boron concentration, as soon as the average temperature of the coolant varies from the set temperature defined by the set temperature profile, taking account of a "dead band" around the temperature profile so that the different uncertainties in temperature measurements can be taken into account.

Thus, the set temperature range thus defined by the plurality of variable amplitude temperature intervals, should be differentiated from a "dead band" around the reference temperature (FIG. 1). Conventionally, a dead band has a small and constant amplitude of the order of a maximum of 0.5 and 1° C., and is used to limit unwanted actions on control clusters within a range consistent with the accepted temperature uncertainty.

The control method for a pressurised water nuclear reactor according to the invention may also have one or several of the following characteristics, considered individually or in any technically possible combination:

the set temperature interval has a maximum temperature amplitude for a thermal power or a range of thermal powers on which a frequency regulation of the nuclear reactor is made;

the amplitude of said interval is maximum between 40% and 80% nominal power;

the amplitude of said interval is maximum between 80% and 100% exclusive of the nominal power;

said set temperature interval lies within a zone in which the lower limit corresponds to the set temperature at 0% nominal power and the upper limit corresponds to the set temperature at 100% nominal power;

the method comprises a step to regulate at least one other core parameter among the axial power distribution and the capacity for instantaneous return to power when the primary coolant temperature is within the set temperature interval;

said temperature interval has a variable amplitude at least over a thermal power range of between 50% and 100% nominal power;

said set temperature interval is surrounded by a dead band.

Other characteristics and advantages of the invention will become clear after reading the description given below for guidance and in no way imitative, with reference to the appended drawings among which:

FIG. 1, already described, shows a set temperature profile for the primary coolant as a function of the thermal power of a pressurised water nuclear reactor;

FIG. 2, already described, shows a programmed variation profile of the reference temperature during load following of a pressurised water nuclear reactor;

FIG. 6b is a graph showing the variation of the Xenon effect during load following shown in FIG. 6a;

FIG. 3 shows a first example embodiment of a set temperature range made on the temperature program of a nuclear reactor operating in load following. It is considered that load variations are most frequently made between 50% or 60% nominal power (PN) and 100% PN, therefore this is the variation range in which the maximum gain should be made on control cluster displacements.

At 0% PN and 100% PN, the set temperature is defined by a single value of the set temperature (i.e. by a zero temperature amplitude) rather than a set temperature range. Set temperature values $T_{REF_{MIN}}$ at 0% PN and $T_{REF_{MAX}}$ at 100% PN are conventionally defined so as to minimise any impacts on accident studies and taking account of the capability of producing a sufficient steam pressure for the turbine. In general, the set temperature values $T_{REF_{MIN}}$ at 0% PN and $T_{REF_{MAX}}$ at 100% PN according to the invention are identical to the set temperature values according to the state of the art for these same thermal power values.

From 0% to 35% PN, the set temperature is conventionally made by a set temperature varying linearly as a function of the reactor power, a single value of the set temperature being associated with a given thermal power of the reactor.

Between 35% and 100% nominal power (PN), the set temperature is defined by a temperature range 10 composed of a plurality of set temperature intervals ΔTREF with variable amplitudes as a function of the thermal power, the temperature range 10 being delimited by a high threshold value $T_{CMAX}$ and a low threshold value $T_{CMIN}$.

Between 60% and 100% PN, the maximum limiting value of set temperature intervals ΔTREF is constant and corresponds to the set temperature at 100% PN, namely $T_{CMAX}$.

Between 35% and 60% PN, the minimum limiting value of set temperature intervals ΔTREF is constant and corresponds to the set temperature at 25%, namely $T_{CMIN}$.

The set temperature range 10 thus shown as an example allows a maximum temperature variation of the primary coolant at a thermal power of 60% PN. Thus, no temperature regulation actions are initiated as long as the temperature of the primary coolant is within the range (within a dead band $\Delta_{BM}$ around the set temperature interval ΔTREF).

Figure 1:
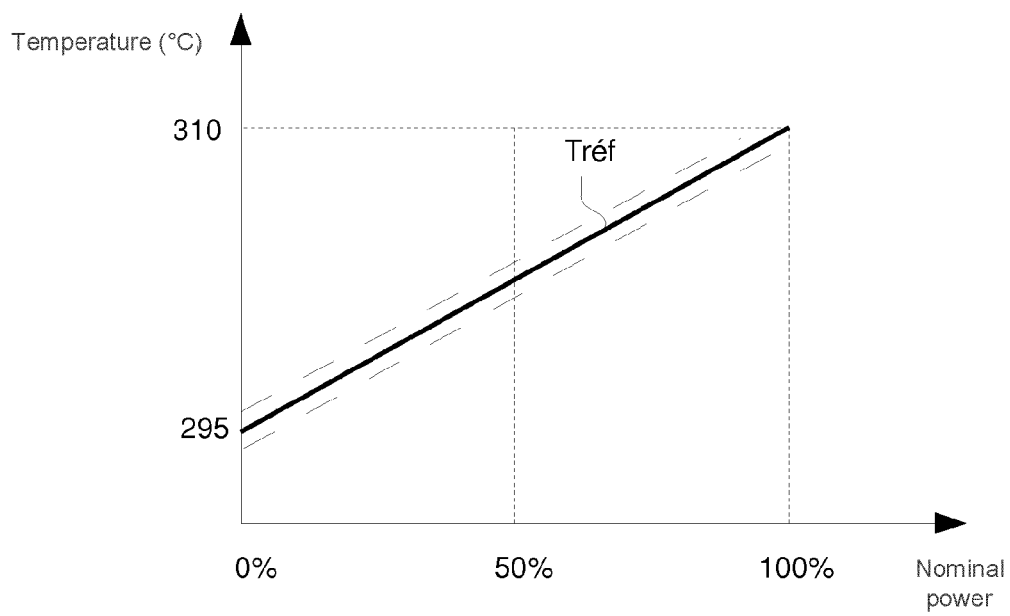
Figure 2:
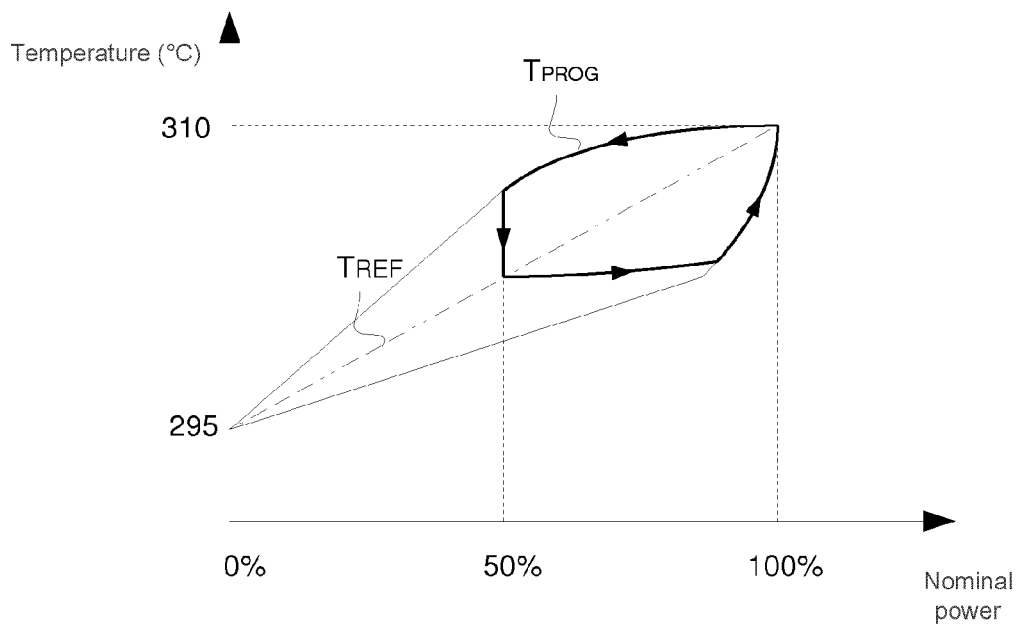
Figure 3:
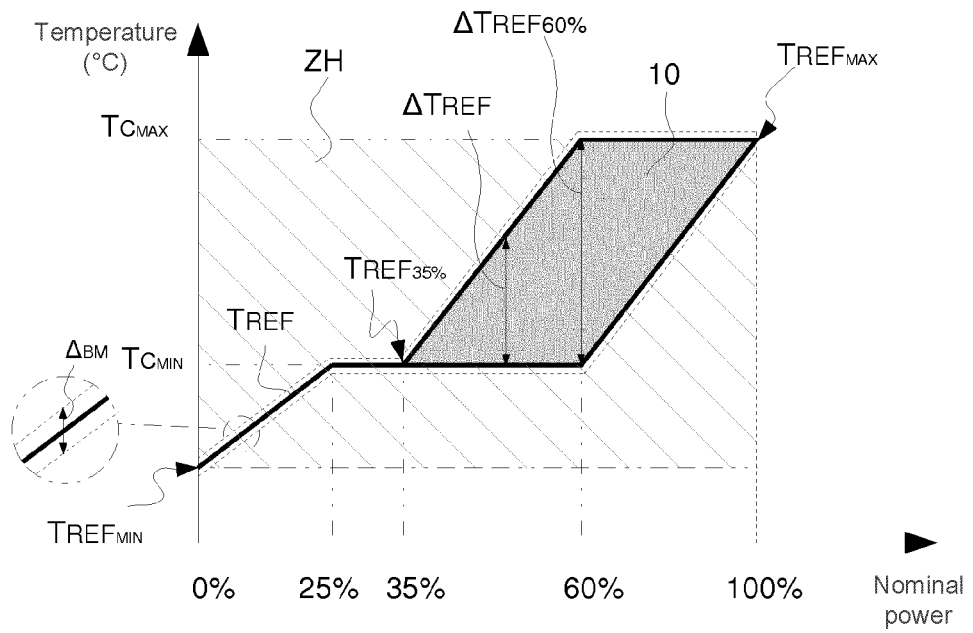
FIG. 3 shows a first example of a variable amplitude set temperature range as a function of the thermal power according to the invention.

Thus, the temperature range 10 shown in FIG. 3 minimises actions, for example such as displacements of control clusters, during operation of a nuclear reactor operating in load following and for which load variations due to frequency regulation (for example ±5%) are usually made around 60% nominal power.

Figure 4:
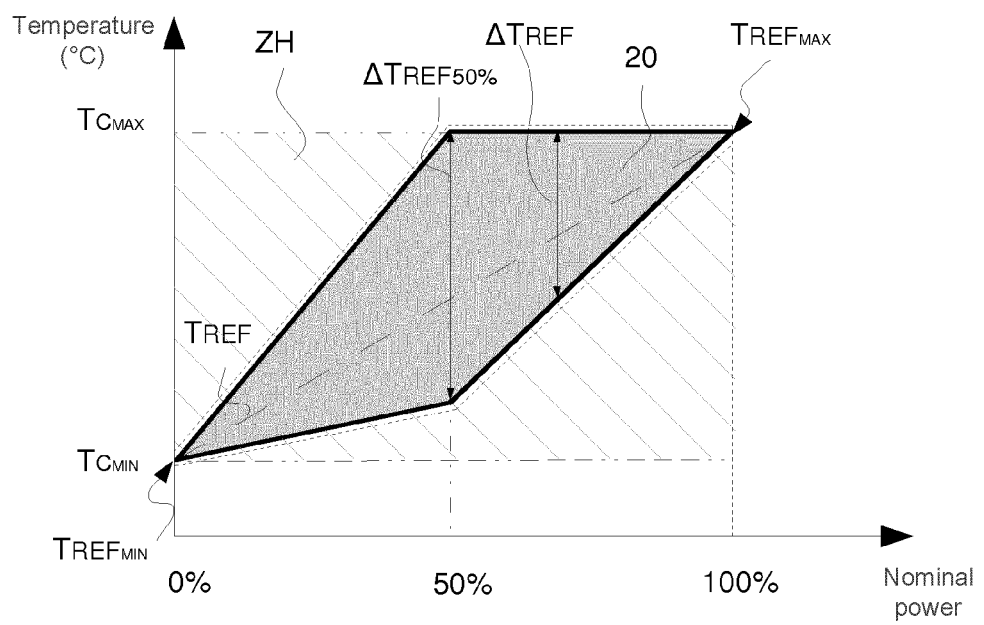
FIG. 4 shows a second example of a variable amplitude set temperature range as a function of the thermal power according to the invention.

FIG. 4 shows a second example embodiment of a set temperature range 20 made on the temperature program of a nuclear reactor operating in load following. This second set temperature range is defined to allow a maximum variation of the primary coolant temperature at 50% PN, a value at which frequency regulation is preferred. In the same way as for the first example described above, the set temperatures at 0% PN and at 100% PN is defined by a single set value $T_{REF_{MIB}}$ (at 0% PN) and $T_{REF_{MAX}}$ (at 100% PN) so as to minimise any impacts on accident studies and to take account of the steam pressure demanded by the turbine. Values of set temperatures $T_{REF_{MIN}}$ at 0% PN and $T_{REF_{MAX}}$ at 100% PN are identical to the set temperature values according to the state of the art for these same values of the thermal power, the variation of the set temperature TREF as a function of the thermal power according to the state of the art being shown as a dashed straight line reference TREF in FIG. 4 for comparison purposes.

According to another embodiment (not shown), the temperature range may also include:
- a first part, for example between 0% and 35% nominal power, in which temperature intervals have a variable amplitude that increases as a function of the power,
- a second part, for example between 35% and 70% nominal power, in which temperature intervals have a constant non-zero maximum amplitude, and;
- a third part, for example between 70% and 100% nominal power, in which temperature intervals have a variable amplitude that decreases as a function of the power.

This temperature range thus described is particularly suitable for nuclear reactors operating in load following with low load levels (between 35% and 70% PN) different from the level at which the frequency regulation is done.

In parallel with this regulation to maintain the primary coolant temperature within a set temperature interval, the other core parameters, namely the axial power distribution (axial offset) and the capacity for instantaneous power buildup ($P_{max}$) are always controlled in parallel, by varying the positions of the control clusters and the boron concentration of the primary coolant.

Figure 5A:
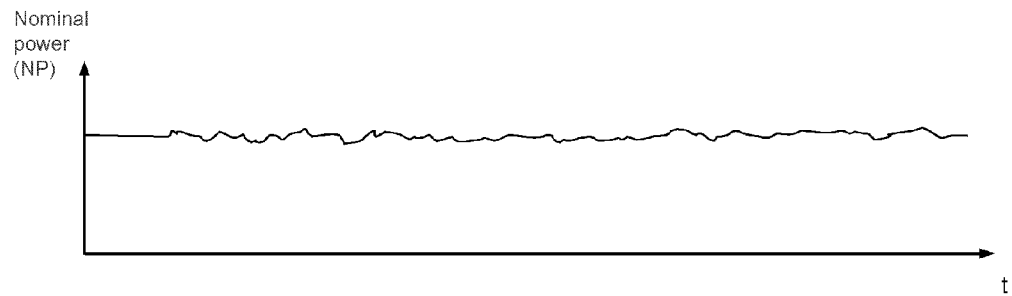
FIG. 5a is a graph showing an example variation of the nominal reactor power as a function of time during operation in frequency regulation.
Figure 5B:
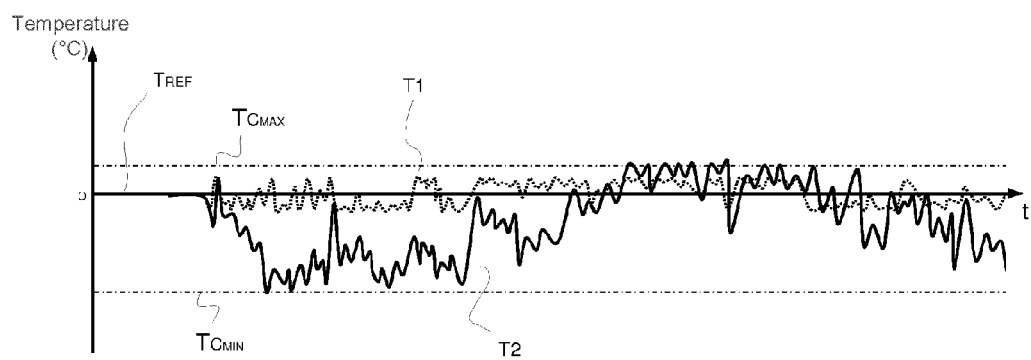
FIG. 5b is a graph showing temperature variations as a function of time obtained by use of the control method according to the invention, during operating in frequency regulation shown in FIG. 5a, in comparison with temperature variations as a function of time obtained by use of the control method according to the state of the art.
Figure 5C:
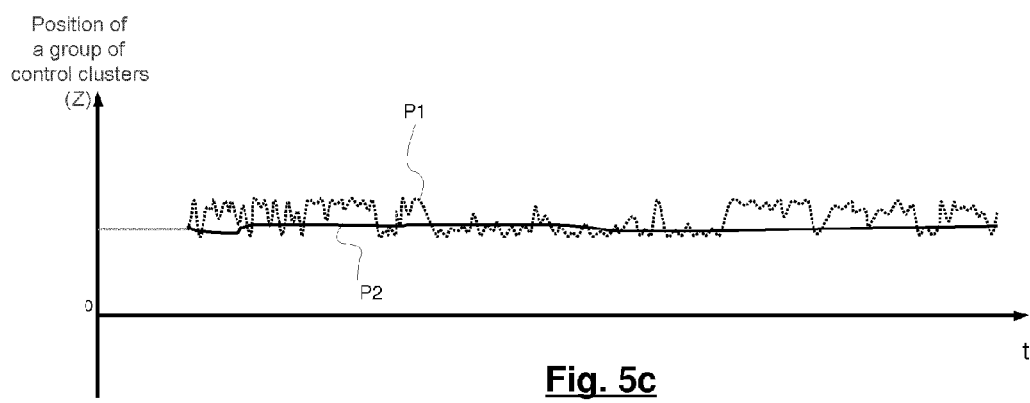
FIG. 5c is a graph showing variations of the position of a group of control clusters obtained by use of the control method according to the invention during operation in frequency regulation shown in FIG. 5a, in comparison with variations in the position of a group of control clusters obtained by the use of a control method according to the state of the art.

FIGS. 5a, 5b and 5c show temperature variations of the reactor and the position of a group of control clusters resulting from use of the control method according to the invention during operation in frequency regulation shown particularly by the graph in FIG. 5a.

FIG. 5b more particularly shows free temperature variations (curve T2) in the set temperature interval ΔTREF delimited by threshold values $T_{CMAX}$ and $T_{CMIN}$.

For comparison, the graph also shows temperature variations (curve T1) resulting from a temperature regulation relative to a reference temperature TREF for the same operation in frequency regulation.

Therefore free variation of the primary coolant temperature will compensate for power variations. Thus, the method according to the invention can eliminate the compensation of power variations by a very large number of movements of control clusters so as to keep the primary coolant temperature as close as possible to the reference set temperature TREF.

FIG. 5c shows the gain in cluster movements obtained by use of the method according to the invention, for the example of operation in frequency regulation shown in FIG. 5a. Curve P1 shows cluster movements necessary to maintain the temperature of the primary coolant as close as possible to the reference set temperature TREF (application of a control according to the state of the art), and curve P2 shows cluster movements necessary to maintain the temperature of the primary coolant within the set temperature interval.

Thus, the use of the set temperature range to regulate the temperature of the nuclear reactor during operation in frequency regulation can significantly reduce or even eliminate control cluster movements.

The use of a temperature range according to the invention also has the advantage that it reduces effluent volumes during operation of the nuclear reactor in load following.

Figure 6A:
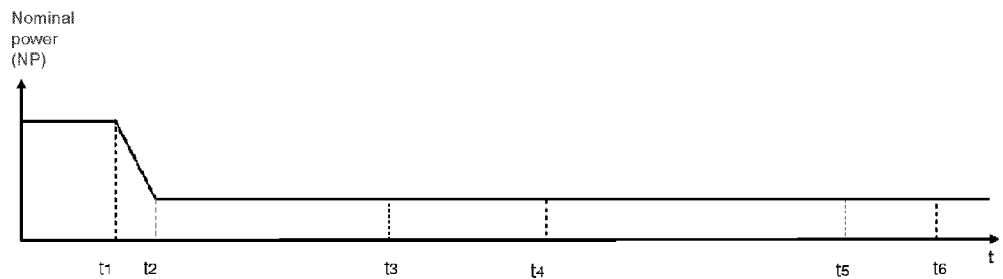
FIG. 6a is a graph showing an example variation of the nominal reactor power as a function of time during load following.
Figure 6B:
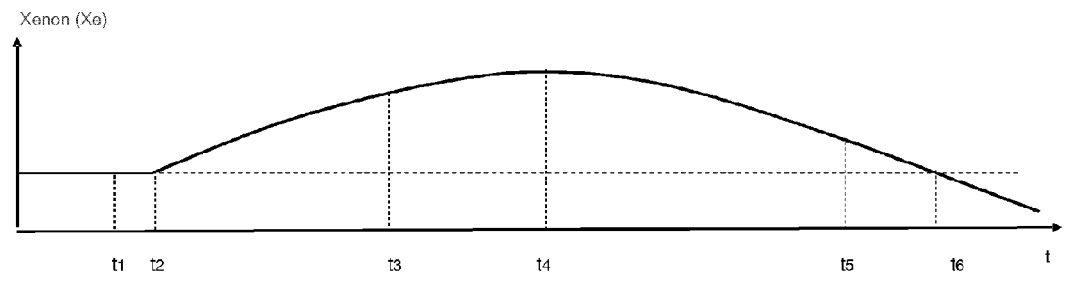
Figure 6C:
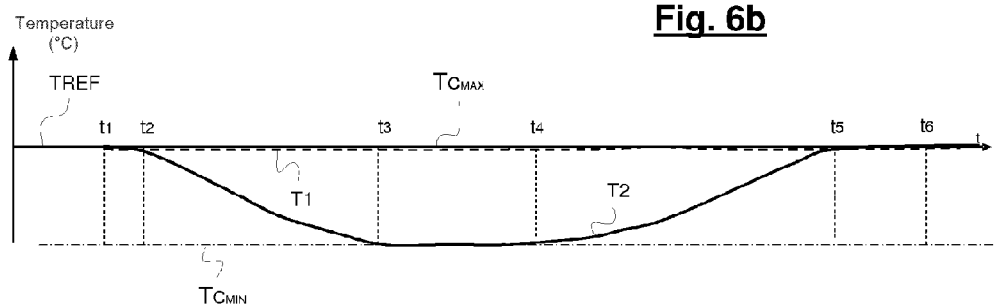
FIG. 6c is a graph showing temperature variations as a function of time obtained by use of the method according to the invention during operation in load following shown in FIG. 6a, in comparison with temperature variations as a function of time obtained by use of a control method according to the state of the art.
Figure 6D:
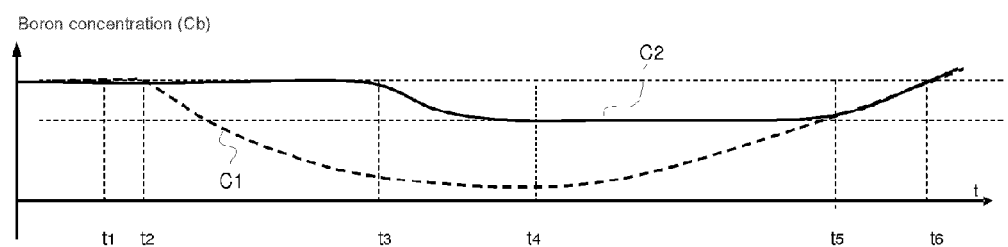
FIG. 6d is a graph showing variations in the boron concentration obtained by use of the method according to the invention during operation in load following shown in FIG. 6a, in comparison with variations in the boron concentration obtained by use of a control method according to the state of the art.

Thus, during operation in load following as shown as an example by the graph in FIG. 6a, free variation of temperature within the set interval makes it possible to correct the effects of reactivity by taking account of the Xenon effect (shown by the graph in FIG. 6b) to reduce the number of steps of control cluster control mechanisms (not shown) and reduce the volumes of effluents (shown in FIG. 6d).

To achieve this, FIG. 6c shows temperature variations during load following shown in FIG. 6a and FIG. 6d shows variations in the boron concentration during this same load following.

The graph shown in FIG. 6c more particularly shows free temperature variations (curve T2) within the set temperature interval ΔTREF delimited by threshold values $T_{CMAX}$ and $T_{CMIN}$ resulting from use of the control method according to the invention. For comparison, the graph also shows temperature variations (curve T1) resulting from a temperature regulation relative to a reference temperature TREF resulting from use of a control method according to the state of the art.

The graph shown in FIG. 6d more particularly shows the variations in the boron concentration (curve C2) during load following resulting from use of the control method according to the invention. For comparison, the graph also shows variations in the boron concentration (curve C1) during the same load following resulting from the use of a control method according to the state of the art.

As shown in FIG. 6d, the free temperature variation within the set temperature interval can retard the beginning of dilution (curve C2). When the temperature reaches a threshold value of the set temperature interval ($T_{CMIN}$ at time t3), regulation is necessary to keep the temperature within the set temperature interval ΔTREF (from time t3 to time t4). Therefore this regulation is made by dilution starting from t3. At time t4, the reactor temperature returns within the set temperature interval ΔTREF and dilution is stopped. Starting from time t5, boration is applied to compensate for the temperature that reaches the threshold value $T_{CMAX}$ and it is continued starting from t6 so as to compensate for the reduction in Xenon that can be seen on the curve in FIG. 6b.

Thus, FIG. 6d shows the reduction in effluent volumes generated during a load following as an example (curve C2) compared with volumes of effluents generated by use of a control method according to the state of the art (curve C1).

The invention has been described particularly for application with control mode T; however, the invention is also applicable to all control modes known to those skilled in the art and not only to the control modes mentioned in this application.

What is claimed is:

1. A method of controlling a pressurized water nuclear reactor, said reactor comprising a core generating thermal power cooled by a primary coolant and instrumentation lines for measurement of representative data of a thermal power and for measurement of a temperature of the primary coolant;

said method comprising:

acquiring data corresponding to at least a thermal power and a temperature of the primary coolant of the core operating conditions via the instrumentation lines, and adjusting the temperature of the primary coolant responsive to the temperature of the primary coolant, for a given thermal power, being outside a predefined set temperature interval (ΔTREF) which is based on the thermal power, wherein said set temperature interval (ΔTREF) comprises:

a variable temperature amplitude (ΔT) within a thermal power range between N % and 100% of a nominal power, where N is between 0 and 100, inclusive of 0 and exclusive of 100;

a zero amplitude at 100% nominal power;

a zero amplitude at N % of the nominal power.

2. The method of controlling a pressurized water nuclear reactor according to claim 1, wherein the set temperature interval ($\Delta$TREF) has a maximum temperature amplitude ($\Delta$T) for a thermal power or range of thermal powers on which frequency regulation is done for a nuclear reactor.

3. The method of controlling a pressurized water nuclear reactor according to claim 1, wherein the temperature amplitude ($\Delta$T) of said interval ($\Delta$TREF) is maximum between 40% and 80% of the nominal power.

4. The method of controlling a pressurized water nuclear reactor according to claim 2, wherein the temperature amplitude ($\Delta$T) of said interval ($\Delta$TREF) is maximum between 80% and 100% exclusive of the nominal power.

5. The method of controlling a pressurized water nuclear reactor according to claim 1, wherein said set temperature interval ($\Delta$TREF) lies within a zone (ZH) in which the lower limit corresponds to the set temperature at 0% nominal power (TREFMIN) and the upper limit corresponds to the set temperature at 100% nominal power (TREFMAX).

6. The method of controlling a pressurized water nuclear reactor according to claim 1 further comprising adjusting at least one other core operating condition selected from the group consisting of an axial power distribution (AO) and a capacity for instantaneous return to power (Pmax), when the primary coolant temperature is within the set temperature interval ($\Delta$TREF).

7. The method of controlling a pressurized water nuclear reactor according to claim 1, wherein said temperature interval ($\Delta$TREF) has a variable amplitude ($\Delta$T) at least over a thermal power range of between 50% and 100% nominal power.

8. The method of controlling a pressurized water nuclear reactor according to claim 1, wherein said set temperature interval ($\Delta$TREF) is surrounded by a dead band ($\Delta$BM).

\* \* \* \* \*